(12) United States Patent
Addis

(10) Patent No.: US 6,918,739 B2
(45) Date of Patent: Jul. 19, 2005

(54) SEAL SUPPORT

(75) Inventor: Mark E. Addis, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 66 days.

(21) Appl. No.: 10/330,746

(22) Filed: Dec. 26, 2002

(65) Prior Publication Data

US 2004/0126222 A1 Jul. 1, 2004

(51) Int. Cl.$^7$ .............................................. F01D 1/100
(52) U.S. Cl. ...................... 415/1; 415/231; 415/174.2; 415/17; 415/30; 277/355
(58) Field of Search .................. 415/17, 30, 1, 415/173.3, 174.2, 231; 277/355, 353, 349

(56) References Cited

U.S. PATENT DOCUMENTS

| | | | |
|---|---|---|---|
| 4,947,639 A | 8/1990 | Hibner et al. | |
| 5,044,781 A | * 9/1991 | Werner | 384/99 |
| 5,201,530 A | 4/1993 | Kelch et al. | |
| 5,351,971 A | 10/1994 | Short | |
| 5,370,402 A | * 12/1994 | Gardner et al. | 277/411 |
| 5,599,026 A | 2/1997 | Sanders et al. | |
| 5,794,942 A | * 8/1998 | Vance et al. | 277/303 |
| RE36,270 E | 8/1999 | Duggan | |
| 5,969,244 A | * 10/1999 | Machado | 73/431 |
| 6,168,162 B1 | 1/2001 | Reluzco et al. | |
| 6,308,957 B1 | * 10/2001 | Wright | 277/355 |
| 6,318,728 B1 | 11/2001 | Addis et al. | |

* cited by examiner

Primary Examiner—Ninh H. Nguyen
(74) Attorney, Agent, or Firm—Bachman & LaPointe, P.C.

(57) ABSTRACT

A turbine engine has a rotor shaft rotatably carried within a non-rotating support structure. A seal is carried by the support structure circumscribing the shaft and having a flexible sealing element for sealing with the shaft. A chamber is located between the seal and support structure. A fluid is carried within the chamber and damps radial excursion of a seal axis from a support structure axis. The seal may be a full annulus or may be segmented. The fluid may be contained within one or more elastomeric bladders.

28 Claims, 5 Drawing Sheets

SEAL SUPPORT

BACKGROUND OF THE INVENTION (1) Field of the Invention

This invention relates to shaft seals, and more particularly to turbine engine shaft seals.

(2) Description of the Related Art

In turbomachinery applications, it is often necessary to provide a seal between a rotating shaft and a housing element. At the seal, the shaft typically has symmetry around a central axis (e.g., the shaft has a cylindrical surface area). The shaft axis is normally coincident with the axis of rotation and with an axis of the housing in which the seal is mounted. However, vibration may induce small local oscillatory excursions of the axis of rotation. Brush and labyrinth seals may have sufficient compliance in their respective bristle packs and labyrinth teeth to accommodate relatively minor excursions. To accommodate greater excursions, there may be a non-rigid mounting of the seal element to the housing. This mounting permits excursions of the shaft axis to radially shift the seal relative to the housing to avoid damage to the seal.

BRIEF SUMMARY OF THE INVENTION

A turbine engine has a rotor shaft rotatably carried within a non-rotating support structure. A seal is carried by the support structure circumscribing the shaft and having a flexible sealing element for sealing with the shaft. A chamber is located between the seal and support structure. A fluid is carried within the chamber and damps radial excursion of a seal axis from a support structure axis. The seal may be a full annulus or may be segmented. The fluid may be contained within one or more elastomeric bladders.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
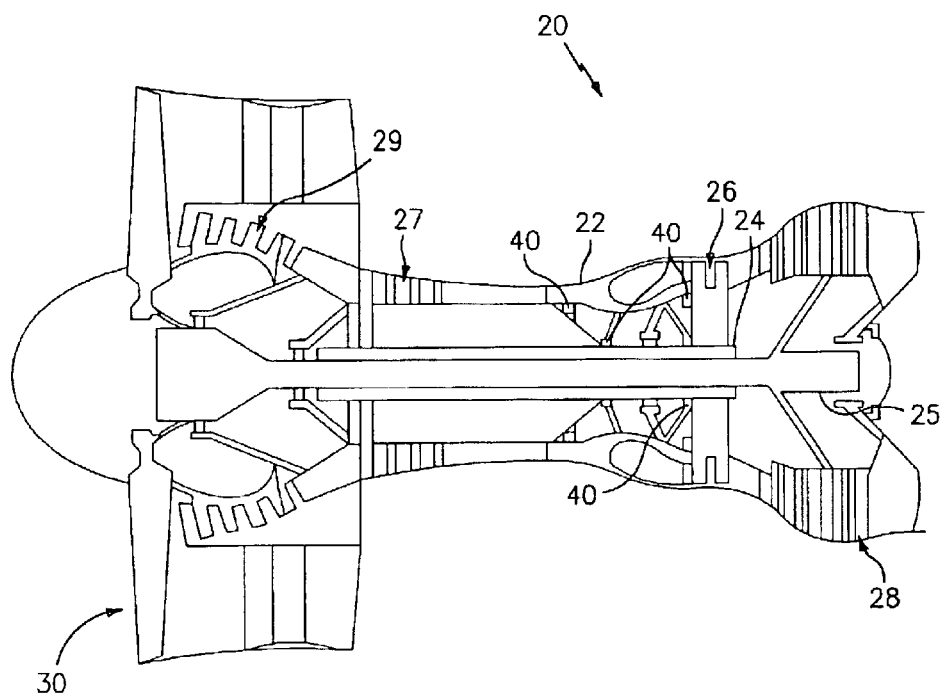
FIG. 1 is a longitudinal semi-schematic sectional view of a turbine engine.

FIG. 1 shows a turbine engine 20 having a housing case 22 containing concentric high and low pressure rotor shafts 24 and 25. The shafts are mounted within the case for rotation about an axis 500 which is normally coincident with central longitudinal axes of the housing and shafts. The high pressure rotor shaft 24 is driven by the blades of a high pressure turbine section 26 to in turn drive the blades of a high pressure compressor 27. The low pressure rotor shaft 25 is driven by the blades of a low pressure turbine section 28 to in turn drive the blades of a low pressure compressor section 29 and a fan 30.

The rotor shafts are supported relative to the case by a number of bearing systems. The rotor shafts may be sealed relative to the case by sealing systems 40 which may include brush sealing elements, labyrinth sealing elements, or the like.

Figure 2:
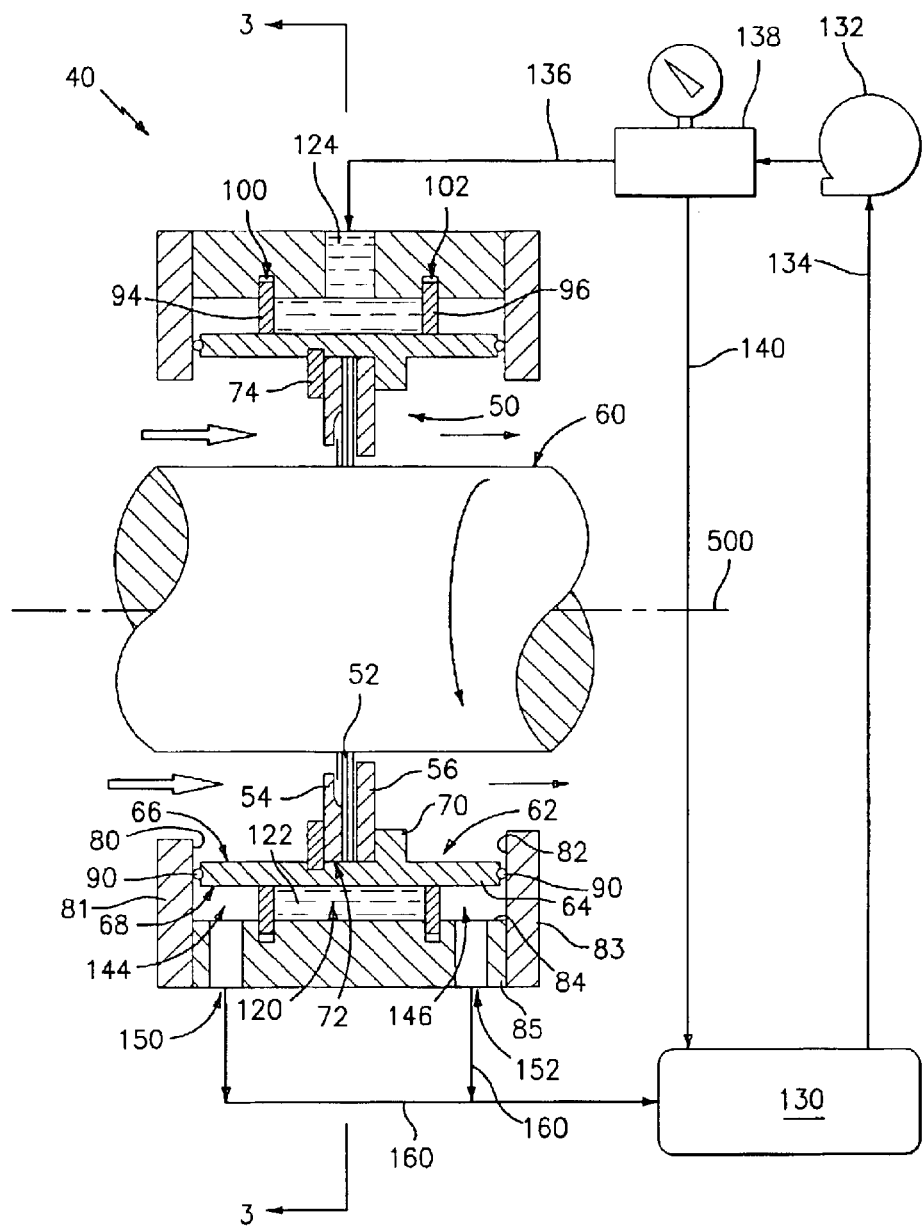
FIG. 2 is a partial semi-schematic longitudinal sectional view of a seal system of the engine of FIG. 1.

FIG. 2 shows further details of an exemplary sealing system 40. The exemplary system includes a brush seal 50 having a bristle pack 52 secured in a seal body comprising a pair of backing plates 54 and 56. The plates 54 and 56 are respectively designated as the side plate and the back plate and sandwich the bristle pack on respective high and low pressure sides thereof. In the exemplary embodiment, the bristle roots are secured between the plates with bristle tips extending inward therefrom to contact the shaft outer surface 60. Bristle and plate materials are typically various metal alloys such as nickel- or cobalt-based superalloys and the plates and bristle roots may thus be secured by welding. Additional shorter bristles may intervene between the sealing bristles contacting the shaft and the backplate. The tips of these bristles may be closer to the rotor than is the inboard surface of the backplate. Such an arrangement provides additional support to the sealing bristles during true running operation while limiting the chance of damage during a rotor excursion.

The seal 50 is contained within an annular seal backing/mounting ring 62. The ring 62 includes an annular sleeve portion 64 having interior and exterior surfaces 66 and 68. On the low pressure side, a short flange 70 extends radially inward from the surface 66. The seal is accommodated within the ring such that an exterior rim surface 72 of the seal contacts the interior surface 66 while a downstream radial surface of the plate 56 contacts an upstream radial surface of the flange 70. A retaining ring 74 is captured in a groove in the surface 66 so that a downstream surface of the ring 74 contacts an upstream surface of the plate 56 to sandwich the seal 50 between the plate 74 and flange 70 to firmly retain the seal relative to the mounting ring.

The mounting ring 62 is accommodated within a compartment in the case defined by respective downstream and upstream surfaces 80 and 82 of upstream and downstream walls 81 and 83 and an interior surface 84 of an annular wall 85. Upstream and downstream rims of the sleeve 64 carry o-rings 90 for sealing with the surfaces 80 and 82. The mounting ring 62 includes a pair of upstream and downstream seal rings 94 and 96 extending radially outward from the exterior surface 68. Exemplary seal rings may be similarly formed to split piston rings. They may be formed by a casting and machining process. Hood stress in the seal rings may allow them to maintain engagement with the mounting ring while freely sliding radially within the channels 100 and 102. Fluid pressure may allow the seal rings to seat axially against radial surfaces of the channels.

Exterior annular rim portions of the rings 94, 96 are captured within radial channels 100 and 102 in the surface 84. The channel bases are of sufficiently greater diameter than the sealing ring rims to permit the sealing rings (and thus the mounting ring) a desired amount of radial float relative to the case. The sealing rings and portions of the sleeve 64 and wall 85 between the rings bound a first chamber 120 containing a fluid 122. Exemplary fluids are oils, water and air. Advantageously in a turbine engine application, the fluid is useful in an operational range of 150° C. to 550° C. (e.g., is non-flammable and does not undergo a phase change or decompose).

The fluid 122 may be introduced to the chamber 120 through a port 124 in the wall 85. A fluid source may comprise a reservoir 130 such as a sump tank or pressure vessel. To deliver the fluid from the reservoir, a pump 132 is connected to the reservoir via a conduit 134. The pump is connected to the port 124 via a conduit 136 in which a pressure regulator 138 is positioned. The pressure regulator is in turn coupled to the reservoir via a conduit 140 for returning excess fluid to the reservoir.

In operation, there may be leakage of the fluid around the rings 94 and 96 into chambers 144 and 146 between the sleeve 64 and wall 85 respectively upstream and downstream of the rings 94 and 96. Ports 50 and 152 are provided in the wall 85 on respective upstream and downstream sides of the rings 94 and 96 to permit a return of leaked fluid from the chambers 144 and 146 to the reservoir via a return conduit system 160.

Figure 3:
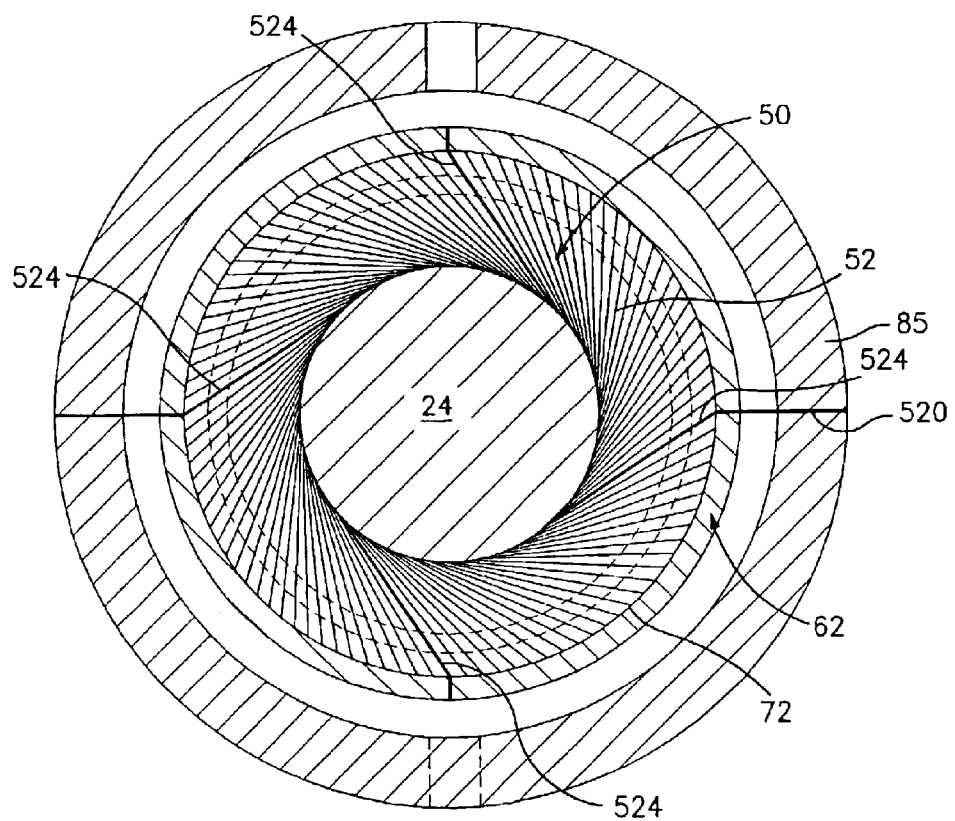
FIG. 3 is a partial semi-schematic transverse sectional view of the seal system of FIG. 2, taken along line 3—3.

FIG. 3 shows exemplary segmenting of the case and seal system. The exemplary case is longitudinally split into two 180° sections along a planar split interface 520. To maintain the integrity of the ring 62, its interfaces are provided with shiplap/tongue & groove connections. The seal 50 is split into nominal 90° segments along four planar interfaces 524. The interfaces 524 are at an off-radial angle so as to be locally parallel to the bristles. The mounting ring 62 is similarly split or may be split in two, similar to the case.

In operation, a radial excursion of the shaft axis relative to the case axis will apply a net force to the bristles. The force is transmitted to the rigid portions of the seal (e.g., the plates and fixed outboard bristle ends. In doing this, the bristles may flex. Advantageously the pump and regulator maintain sufficient fluid pressure that, given fluid viscosity, density, and other properties, permit the fluid to damp radial excursion of the seal induced by the force. It may be possible for the engine control system (not shown) to regulate pressure based upon engine operating conditions to provide a desired degree of damping.

Figure 4:
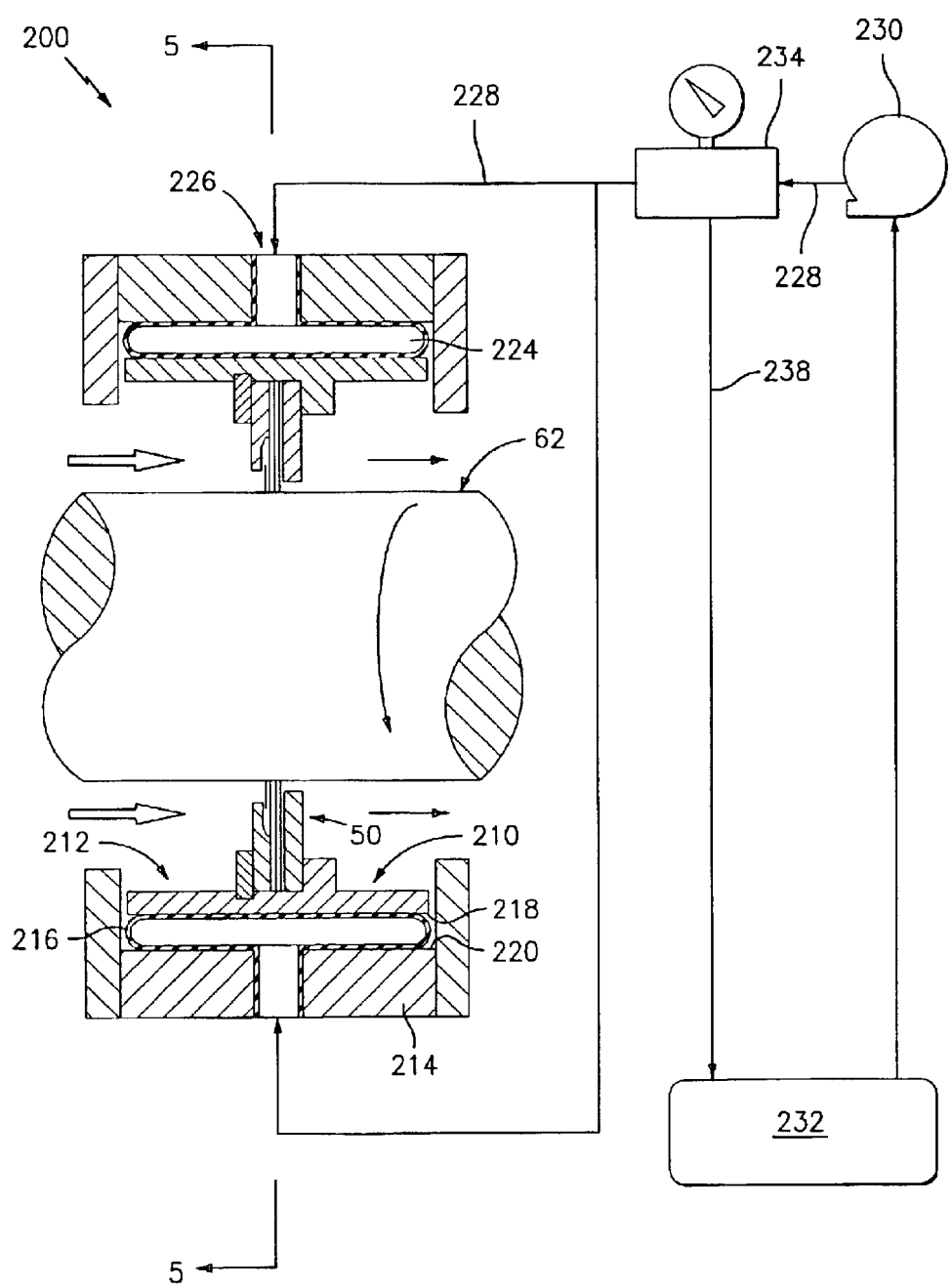
FIG. 4 is a partial semi-schematic longitudinal sectional view of an alternate seal system.

FIG. 4 shows an alternate sealing system 200. Elements in common with the exemplary sealing system 40 are referenced with like numerals. In this embodiment, the seal 50 is similarly held within a mounting ring 210. The mounting ring 210 is captured within a channel 212 formed in a housing wall 214. A flexible annular bladder 216 (e.g., formed of a suitable elastomer) is positioned between an exterior surface 218 of the mounting ring 210 and a base surface 220 of the channel 212. The bladder contains a fluid 224. The bladder is coupled via one or more ports 226 in the housing to supply lines 228 from a pump 230 delivering the fluid from a reservoir 232. A regulator 234 is positioned in the supply lines and has a return line 238 for returning fluid to the reservoir 232.

In operation, the sealing system 200 could be controlled in a similar fashion to the system 40. For an excursion of the seal, the bladder will be locally compressed at one diametric location and locally expanded at the opposite location. Thus the elasticity and other properties of the bladder are relevant to the degree of resistance offered to seal excursions. Relative to the system 40, this elasticity may provide a greater degree of resistance (e.g. a spring constant) to excursion for a given degree of damping. Relative to the system 40, the system 200 may be particularly useful with compressible fluids. Automated control of fluid pressure in the system 200 may provide a high degree of control of seal support. In such an automated system, speed and vibration (e.g., actual vibration levels measured via proximity probes) parameters could be measured and further control inputs could be provided indicating other conditions of operation (e.g., whether the engine was accelerating or decelerating). At startup conditions, a very low pressure could be applied to permit the seal to accommodate the rotor excursions (known as "critical vibration") typical at startup. In stable running conditions, higher pressure could be maintained to keep the seal centered. This may be desirable to prevent high cycle vibration (HCV) from affecting the seal. At lower pressures, the seal may be more prone to HCV. It may be possible to use the engine's compressor as a source of high pressure fluid.

Figure 5:
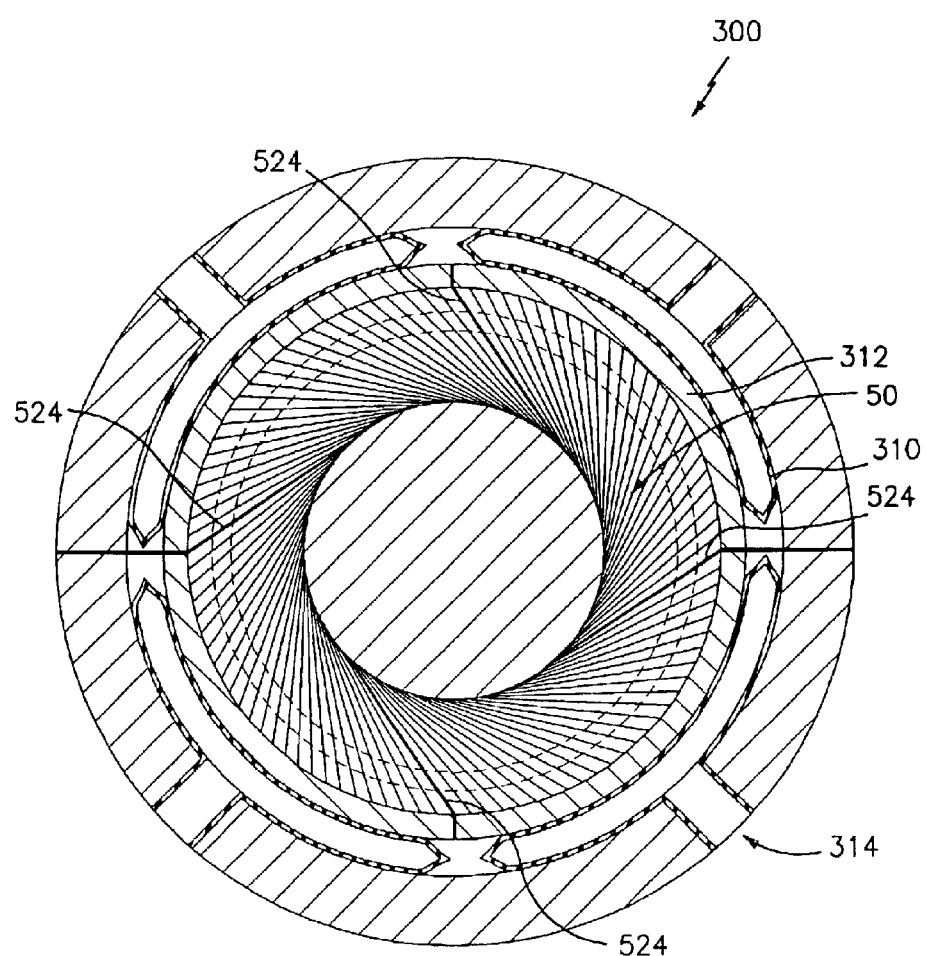
FIG. 5 is a partial semi-schematic transverse sectional view of an alternate seal system.

FIG. 5 shows an alternate sealing system 300 in which the bladder is itself segmented into four segments or smaller bladders 310 positioned end-to-end circumscribing the shaft. Each exemplary bladder 310 extends around somewhat less than 90° of the shaft. The bladder segments are positioned approximately coincident with segments of the seal 50 and its mounting ring 312. Each bladder segment is connected via a case port 314 to a common header supply lines and associated equipment as in the embodiment of FIG. 3. Operation of the system 300 may be generally similar to that of the system 200. The use of separate bladder segments may tend to further increase the effective spring constant for a given fluid type and pressure, bladder material, and the like. Additionally, there exists a possibility of fully or partially independent control over the pressure in the bladder segments giving rise to the possibility of an active positioning of the seal under automated control.

One or more embodiments of the present invention have been described. Nevertheless, it will be understood that various modifications may be made without departing from the spirit and scope of the invention. For example, environmental considerations may influence parameters of seal construction. Similar seals could be used in non-rotating (e.g., static) brush seal applications. In such applications, wear and heat generation may be of less concern than compacting the bristle pack. Such compacting can cause flaring of the bristle tips (brooming) and/or cause the bristles to be permanently deformed the bristle pack inner diameter. Additional features are possible such as a seal anti-rotation features (e.g., dial pins or tabs mounted to the seal and riding in slots in the case). Accordingly, other embodiments are within the scope of the following claims.

What is claimed is:

1. A turbine engine comprising:
   a support structure having a fisrt axis;
   a rotor shaft having a rotor axis and carried by the support structure;
   a seal having a seal axis and carried by the support structure circumscribing the shaft and having a flexible sealing element in contact with the shaft; and
   at least one chamber located between the seal and support structure for carrying a fluid therein to damp radial excursions of the seal axis from the first axis.

2. The engine of claim 1 further comprising a fan carried by the rotor shaft.

3. The engine of claim 1 further comprising:
   a reservoir;
   at least one conduit coupling the reservoir to the chamber; and
   a pump positioned to pump fluid from the reservoir to the chamber through the at least one conduit.

4. The engine of claim 1 wherein said flexible sealing element comprises a bristle pack.

5. With an apparatus having:
   a rotating shaft having a shaft axis and a circumferential surface;

a relatively nonrotating structure having a first axis; and a seal system carried by the relatively nonrotating structure circumscribing the shaft about the circumferential surface and having a seal axis, a method for providing a seal around the shaft comprising:

sensing one or more parameters of rotation of the shaft including a condition of operation other than an actual vibration level; and responsive to said parameters, varying a pressure of a fluid in a chamber of the seal system.

6. The method of claim 5 wherein said varying controls a radial damping of a flexible sealing element of the seal system sealing with the shaft.

7. The method of claim 5 wherein said parameters include at least one of rotational speed and sensed vibration.

8. A sealing system comprising:

a first structure having an axis;

a second structure having an axis and movable relative to the first structure:

a seal:
circumscribing the second structure within the first structure;
having a seal axis;
carried by a support one of the first and second structures; and
having a flexible sealing element for sealing with the other of the first and second structure;

at least one chamber located between the seal and support structure; and a fluid carried within the at least one chamber and damping radial excursions of the seal axis from the axis of the support structure.

9. The system of claim 8 wherein:

said support structure is said first structure; and the second structure is rotatably cared by the first structure.

10. The system of claim 8 wherein said flexible sealing element comprises a bristle pack.

11. A sealing system for providing a seal between relatively rotating inner and outer elements, the system surrounding the inner element and comprising:

a flexible sealing element for sealing with a first of the inner and outer elements; and at least one chamber located between the sealing element and the second of the inner and outer elements for carrying a fluid therein to damp relative movement of the inner and outer elements.

12. The system of claim 11 further comprising:

means for controlling a pressure within the least one chamber.

13. The system of claim 11 wherein the flexible sealing element comprises a bristle pack.

14. The system of claim 11 wherein said at least one chamber is located radially between the sealing element and the second of the inner and outer elements.

15. A turbine engine comprising:

a support structure having a first axis;

a rotor shaft having a rotor axis and carried by the support structure;

a seal having a seal axis and carried by the support structure circumscribing the shaft and having a flexible sealing element in contact with the shaft;

at least one chamber located between the seal and support structure for carrying a fluid therein to damp radial excursions of the seal axis from the first axis; and at least one flexible bladder at least partially containing the fluid.

16. The engine of claim 15 wherein said at least one flexible bladder comprises an annular bladder circumscribing the shaft.

17. The engine of claim 15 wherein said at least one flexible bladder comprises a plurality of bladders positioned end-to-end to circumscribe the shaft.

18. The engine of claim 15 wherein said at least one flexible bladder comprises exactly four bladders positioned adjacently to circumscribe the shaft.

19. The engine of claim 15 wherein said flexible sealing element comprises a bristle pack.

20. A turbine engine comprising:

a support structure having a fist axis;

a rotor shaft having a rotor axis and carried by the support structure;

a seal having a seal axis and carried by the support structure circumscribing the shaft and having a flexible sealing element in contact with the shaft;

at least one chamber located between the seal and support structure for carrying a fluid therein to damp radial excursions of the seal axis from the first axis;

a reservoir;

at least one conduit coupling the reservoir to the chamber;

a pump position to pump fluid from the reservoir to the chamber through the at least one conduit; and an electronically controllable pressure regulator.

21. The engine of claim 1 wherein said flexible sealing element comprises a bristle pack.

22. With an engine having:

a rotating shaft having a shaft axis and a circumferential surface;

a relatively nonrotating structure having a first axis; and a seal system carried by the relatively nonrotating structure circumscribing the shaft about the circumferentially surface and having a seal axis, a method for providing a seal around the shaft comprising:

sensing one or more parameters of rotation of the shaft, including an identification of whether the engine is in a start-up phase; and responsive to said parameters, varying a pressure of a fluid in a chamber of the seal system.

23. The method of claim 22 wherein said varying controls a radial damping of a flexible sealing element of the seal system sealing with the shaft.

24. The method of claim 22 wherein said parameters include at least one of rotational speed and sensed vibration.

25. A sealing system comprising:

a first structure having an axis;

a second structure having an axis and movable relative to the first structure;

a seal:
circumscribing the second structure within the first structure;
having a seal axis;
carried by a support one of the first and second structures; and
having a flexible sealing element for sealing with the other of the first and second structure;

at least one chamber located between the seal and support structure;

a fluid carried within the at least one chamber and damping radial excursions of the seal axis from the axis of the support structure; and at least one elastomeric bladder at least partially containing the fluid.

26. The system of claim 25 wherein:

said support structure is said first structure; and the second structure is rotatably carried by the first structure.

27. The system of claim 25 wherein said flexible sealing element comprises a bristle pack.

28. A sealing system comprising:

a first structure having an axis;

a second structure having an axis and movable relative to the first structure;

a seal:

circumscribing the second structure within the first structure;

having a seal axis;

carried by a support one of the first and second structures; and having a flexible sealing element for sealing with the other of the first and second structure;

at least one flexible bladder located between the seal and support structure; and a fluid at least partially carried within the at least one flexible bladder.

\* \* \* \* \*